US012613961B2

(12) United States Patent
Yu

(10) Patent No.: US 12,613,961 B2
(45) Date of Patent: Apr. 28, 2026

(54) IDENTIFYING ATTACKS TO ACTIVE RESOURCES BY TRUSTED DEVICES WITH FAKE VULNERABILITIES ON DECEPTIVE PROXY RESOURCES

(71) Applicant: Fortinet, Inc., Sunnyvale, CA (US)

(72) Inventor: Kun Yu, San Jose, CA (US)

(73) Assignee: Fortinet, Inc., Sunnyvale, CA (US)

( * ) Notice: Subject to any disclaimer, the term of this patent is extended or adjusted under 35 U.S.C. 154(b) by 48 days.

(21) Appl. No.: 18/610,046

(22) Filed: Mar. 19, 2024

(65) Prior Publication Data

US 2024/0394368 A1 Nov. 28, 2024

Related U.S. Application Data

(63) Continuation-in-part of application No. 18/603,507, filed on Mar. 13, 2024, now Pat. No. 12,361,126, which is a continuation of application No. 18/079,563, filed on Dec. 12, 2022, now Pat. No. 12,299,123.

(51) Int. Cl.
| | |
|---|---|
| *G06F 21/56* | (2013.01) |
| *H04L 9/40* | (2022.01) |
| *G06F 21/57* | (2013.01) |
| *H04W 12/122* | (2021.01) |

(52) U.S. Cl.
CPC .............. *G06F 21/56* (2013.01); *H04L 9/40* (2022.05); *H04L 63/1408* (2013.01); *H04L 63/1491* (2013.01); *G06F 21/577* (2013.01);

*G06F 2221/033* (2013.01); *H04L 63/1416* (2013.01); *H04L 63/1433* (2013.01); *H04W 12/122* (2021.01)

(58) Field of Classification Search
None
See application file for complete search history.

(56) References Cited

U.S. PATENT DOCUMENTS

| | | | | |
|---|---|---|---|---|
| 9,158,915 | B1 * | 10/2015 | Yumer | .................. G06F 21/552 |
| 9,165,142 | B1 | 10/2015 | Sanders et al. | |
| 9,609,019 | B2 * | 3/2017 | Vissamsetty | ........ H04L 63/1491 |
| 9,742,805 | B2 * | 8/2017 | Touboul | .............. G06F 21/554 |
| 10,282,546 | B1 | 5/2019 | Parikh et al. | |
| 10,333,977 | B1 * | 6/2019 | Shamul | .............. H04L 63/1491 |
| 10,339,377 | B2 * | 7/2019 | Joseph | ................. G06V 30/413 |
| 10,432,648 | B1 | 10/2019 | Xu et al. | |
| 10,848,519 | B2 | 11/2020 | Howard et al. | |
| 11,151,248 | B1 | 10/2021 | Batur | |
| 11,689,561 | B2 | 6/2023 | Seifert et al. | |
| 12,107,889 | B2 * | 10/2024 | Kothari | .............. H04L 63/1416 |

(Continued)

*Primary Examiner* — Lashonda Jacobs-Burton
(74) *Attorney, Agent, or Firm* — Law Office of Dorian Cartwright; Dorian Cartwright

(57) ABSTRACT

A plurality of fake vulnerabilities are exposed to network traffic alongside an active resource. Each fake vulnerability cannot harm the active resource and wherein the deceptive proxy device and the legitimate device are reachable by a common IP address. Network traffic is monitored in real-time, to detect an attack by a malicious device concerning at least one of the fake vulnerabilities of the plurality of fake vulnerabilities exposed by the deceptive proxy resource. The malicious device is trusted by the enterprise network. Responsive to the attack detection, a security action is taken with respect to the malicious device.

20 Claims, 5 Drawing Sheets

(56) References Cited

U.S. PATENT DOCUMENTS

| | | | |
|---|---|---|---|
| 12,341,814 B2 * | 6/2025 | Vissamsetty | H04L 63/10 |
| 2007/0226797 A1 * | 9/2007 | Thompson | H04L 63/1416 |
| | | | 726/22 |
| 2008/0034425 A1 * | 2/2008 | Overcash | G06F 21/55 |
| | | | 726/22 |
| 2014/0201842 A1 * | 7/2014 | Tripp | G06F 21/56 |
| | | | 726/25 |
| 2015/0326558 A1 * | 11/2015 | Rombouts | G06F 21/85 |
| | | | 726/5 |
| 2015/0326588 A1 * | 11/2015 | Vissamsetty | H04L 63/1491 |
| | | | 726/23 |
| 2016/0012222 A1 * | 1/2016 | Stolfo | H04L 63/1466 |
| | | | 726/23 |
| 2017/0310704 A1 * | 10/2017 | Wu | H04L 63/1433 |
| 2017/0353490 A1 * | 12/2017 | Krauss | H04L 63/1491 |
| 2017/0353491 A1 * | 12/2017 | Gukal | H04L 63/1491 |
| 2019/0222587 A1 * | 7/2019 | Kamir | H04L 63/1491 |
| 2019/0394237 A1 * | 12/2019 | Saklikar | H04L 63/1433 |
| 2019/0394243 A1 * | 12/2019 | Wiig | G06N 3/043 |
| 2020/0382552 A1 * | 12/2020 | Kruglick | G06F 11/3006 |
| 2021/0141897 A1 | 5/2021 | Seifert et al. | |
| 2022/0086645 A1 * | 3/2022 | Kaushik | H04W 24/08 |
| 2024/0187452 A1 * | 6/2024 | Kaidi | G06F 21/6245 |
| 2024/0248988 A1 | 7/2024 | Taylor | |
| 2024/0250979 A1 * | 7/2024 | Ding | G06N 20/00 |

* cited by examiner

100

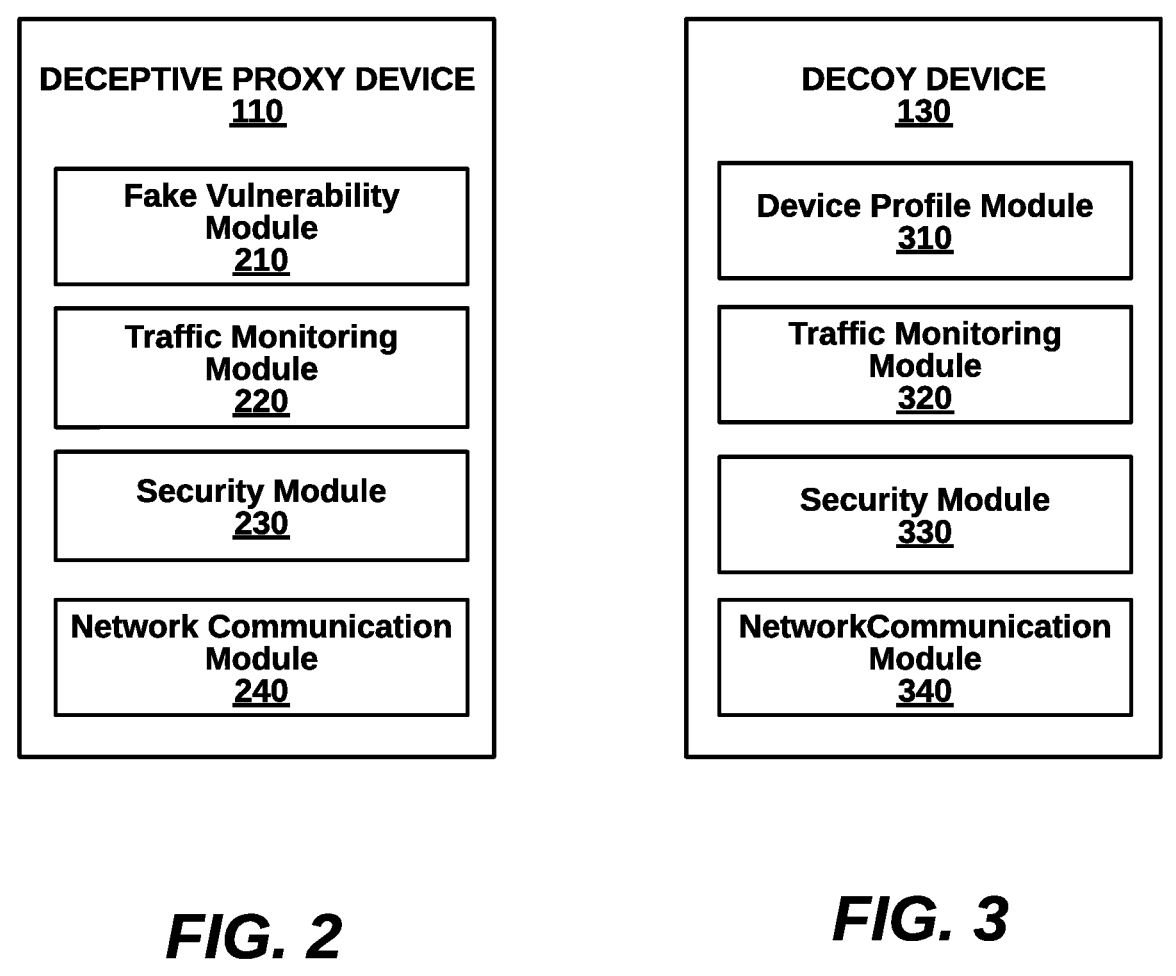

```
┌─────────────────────────────────┐
│   DECEPTIVE PROXY DEVICE         │
│              110                 │
│   ┌───────────────────────────┐ │
│   │   Fake Vulnerability       │ │
│   │   Module                   │ │
│   │   210                      │ │
│   └───────────────────────────┘ │
│   ┌───────────────────────────┐ │
│   │   Traffic Monitoring       │ │
│   │   Module                   │ │
│   │   220                      │ │
│   └───────────────────────────┘ │
│   ┌───────────────────────────┐ │
│   │   Security Module          │ │
│   │   230                      │ │
│   └───────────────────────────┘ │
│   ┌───────────────────────────┐ │
│   │   Network Communication    │ │
│   │   Module                   │ │
│   │   240                      │ │
│   └───────────────────────────┘ │
└─────────────────────────────────┘
```

FIG. 2

```
┌─────────────────────────────────┐
│        DECOY DEVICE              │
│              130                 │
│   ┌───────────────────────────┐ │
│   │   Device Profile Module    │ │
│   │   310                      │ │
│   └───────────────────────────┘ │
│   ┌───────────────────────────┐ │
│   │   Traffic Monitoring       │ │
│   │   Module                   │ │
│   │   320                      │ │
│   └───────────────────────────┘ │
│   ┌───────────────────────────┐ │
│   │   Security Module          │ │
│   │   330                      │ │
│   └───────────────────────────┘ │
│   ┌───────────────────────────┐ │
│   │   NetworkCommunication     │ │
│   │   Module                   │ │
│   │   340                      │ │
│   └───────────────────────────┘ │
└─────────────────────────────────┘
```

IDENTIFYING ATTACKS TO ACTIVE RESOURCES BY TRUSTED DEVICES WITH FAKE VULNERABILITIES ON DECEPTIVE PROXY RESOURCES

RELATED APPLICATIONS

This application claims priority under 35 USC 120 as a continuation-in part of U.S. application Ser. No. 18/079,563, filed on Dec. 12, 2022, now U.S. Pat. No. 12,299,123, issued May 13, 2025, and of U.S. application Ser. No. 18/603,507, filed on Mar. 13, 2024, now U.S. Pat. No. 12,361,126, issued on Jul. 15, 2025, the contents of which are incorporated herein by reference in their entirety.

FIELD OF THE INVENTION

The invention relates generally to computer networks, and more specifically, for identifying attacks to an active resource of the enterprise network by trusted devices with deceptive proxy resources.

BACKGROUND

In networking, deceptive systems are deployed as fake networking devices to attract cyber criminals for attacks in a controlled manner, while luring them away from real targets. In more detail, traditional deception systems add deceptive devices alongside legitimate devices of an enterprise network. Each device has a network address, deceptive IP addresses corresponding to deceptive devices and legitimate IP addresses corresponding to legitimate devices. Malicious devices scan a network to identify network addresses of potential targets. Thus, devices can be identified as malicious by attempting to access network addresses of deceptive devices.

However, some malicious devices actually to reach legitimate devices of the enterprise network. For example, malicious devices may beat probabilities in using networking addresses of scan results to reach a legitimate device before reaching a deceptive device that is able to identify and stop the malicious device. Additionally, an insider (e.g., an employee), or trusted device, may have a priori knowledge to legitimate IP addresses in order to bypass deceptive devices. The trusted device can be more dangerous than non-trusted devices because they are assumed to be non-malicious, to a certain extent.

What is needed is a robust technique for using fake vulnerabilities on proxy resources to identify attacks on legitimate resources of the enterprise network by trusted devices that are able to bypass deceptive IP addresses.

SUMMARY

To meet the above-described needs, methods, computer program products, and systems for identifying attacks to an active resource of the enterprise network by trusted devices with deceptive proxy resources.

In one embodiment, a plurality of fake vulnerabilities are exposed to network traffic alongside an active resource. Each fake vulnerability cannot harm the active resource and wherein the deceptive proxy device and the legitimate device are reachable by a common IP address.

In another embodiment, network traffic is monitored in real-time, to detect an attack by a malicious device concerning at least one of the fake vulnerabilities of the plurality of fake vulnerabilities exposed by the deceptive proxy resource. The malicious device is trusted by the enterprise network.

In still another embodiment, responsive to the attack detection, a security action is taken with respect to the malicious device.

Advantageously, computer networks are improved with better performance from reduced malicious activity.

BRIEF DESCRIPTION OF THE DRAWINGS

In the following drawings, like reference numbers are used to refer to like elements. Although the following figures depict various examples of the invention, the invention is not limited to the examples depicted in the figures.

FIG. 2 is a more detailed block diagram illustrating a deception proxy server of the system of FIG. 1, according to an embodiment.

FIG. 3 is a more detailed block diagram illustrating a decoy device of the system of FIG. 1, according to an embodiment.

DETAILED DESCRIPTION

Methods, computer program products, and systems for identifying attacks to an active resource of the enterprise network by trusted devices with deceptive proxy resources. The following disclosure is limited only for the purpose of conciseness, as one of ordinary skill in the art will recognize additional embodiments given the ones described herein.

I. Systems for Deceptive Proxy Resources (FIGS. 1-3)

Figure 1:
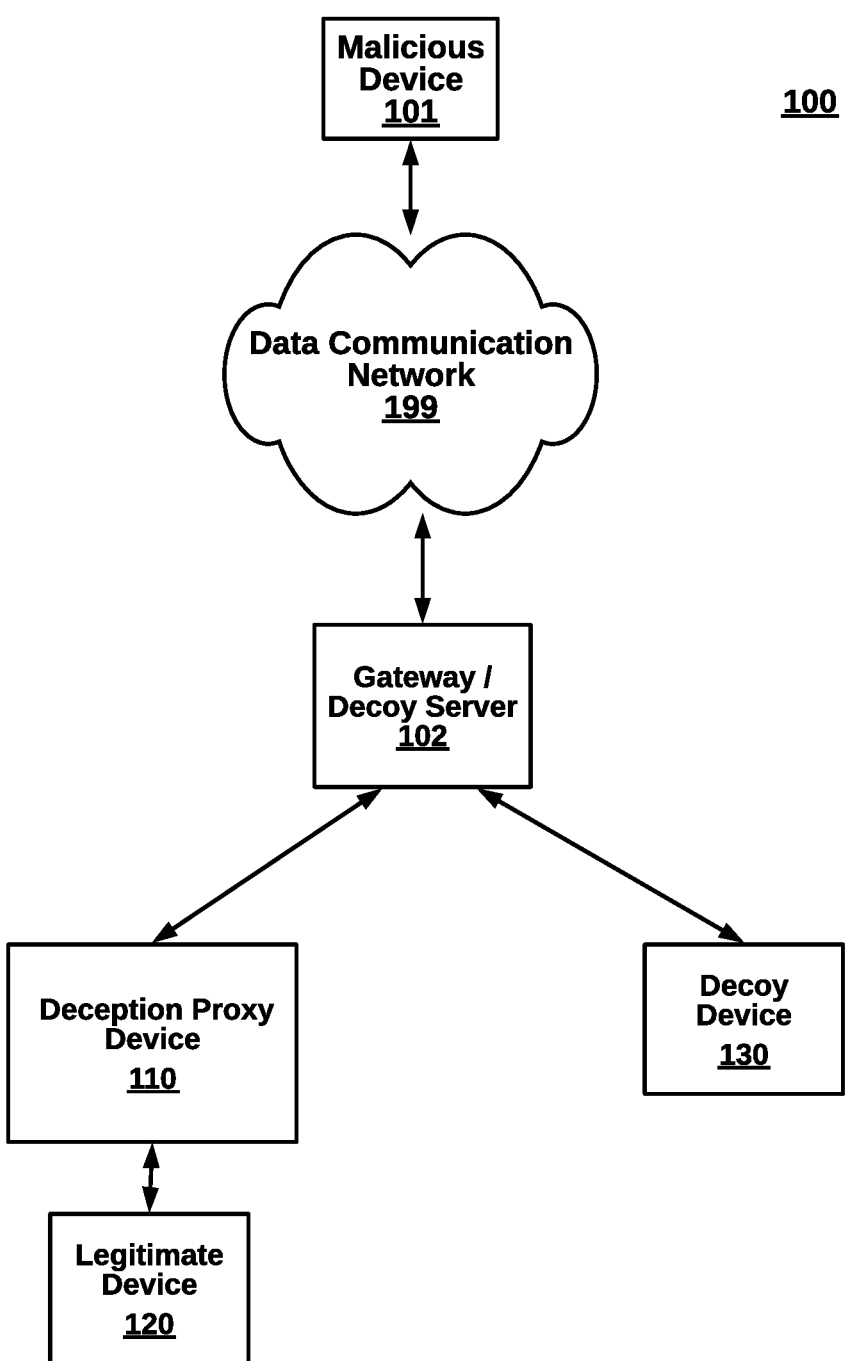
FIG. 1 is a high-level block diagram illustrating aspects of a system coordinating for identifying attacks to an active resource of the enterprise network by trusted devices with deceptive proxy resources, according to some embodiments.
Figure 6:
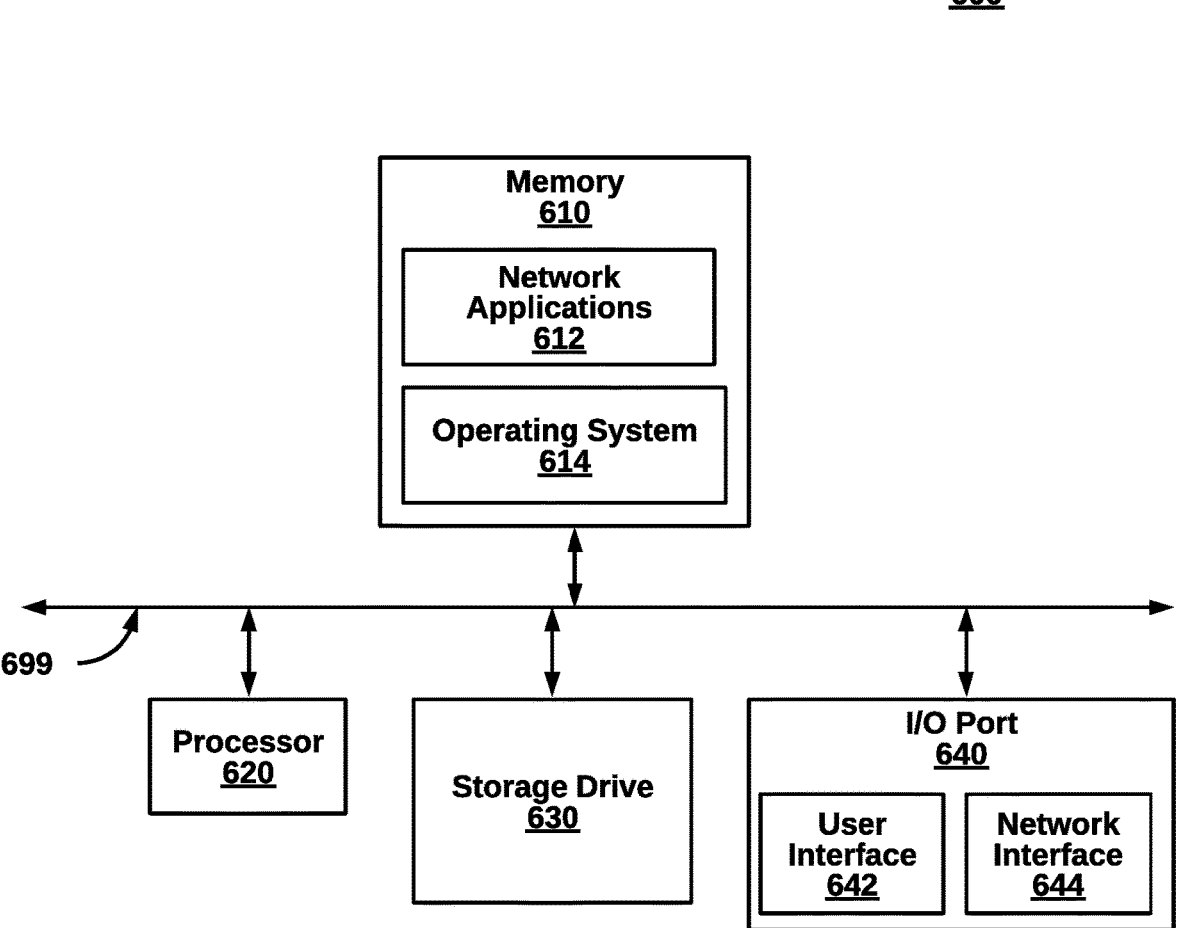
FIG. 6 is a block diagram illustrating an example computing device for the system of FIG. 1, according to an embodiment.

FIG. 1 is a high-level block diagram illustrating a system 100 for identifying attacks to an active resource of the enterprise network by trusted devices, according to an embodiment. The system 100 includes a proxy deceptive device 110, legitimate device 120, and a decoy device 130, on a data communication network 199. Other embodiments of the system 100 can include additional components that are not shown in FIG. 1, such as routers, switches, network gateways, and firewalls, access points and stations. Further, there can be more proxy deceptive devices, legitimate devices and decoy devices. The components of system 100 can be implemented in hardware, software, or a combination of both. An example implementation is shown in FIG. 6.

In one embodiment, the components of the system 100 are coupled in communication over a private network connected to a public network, such as the Internet. In another embodiment, system 100 is an isolated, private network, or alternatively, a set of geographically dispersed LANs. The components can be connected to the data communication system 199 via hard wire (e.g., proxy deceptive device 110 and legitimate device 120, and parallel deceptive device 130). The components can also be connected via wireless networking (e.g., wireless stations). The data communication network 199 can be composed of any combination of hybrid networks, such as an SD-WAN, an SDN (Software Defined Network), WAN, a LAN, a WLAN, a Wi-Fi network, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802.11r, 802.11be, Wi-Fi 6, Wi-Fi 6E, Wi-Fi 7 and the like. Components can use IPv4 or Ipv6 address spaces.

In one embodiment, the deceptive proxy device 110 exposes fake vulnerabilities to network traffic to identify a malicious device 101. As a result, the deceptive proxy device 110 can protect against trusted devices, and can also provide an additional layer of protection against devices that are not trusted. A gateway/decoy server 102 can manage configuration and operation of the deceptive proxy device 110 and decoy device 130 and other decoy processes on the enterprise network.

In general, fake vulnerabilities are common or well-known points of attacks that have a high probability of being used by the malicious device 101. In other embodiments, a specific vulnerability that is now well-known but may be targeted to a specific malicious device is exposed. In one case, the deceptive proxy device 110 may pretend to use an outdated operating system that has well-known vulnerabilities. To do so, responses to probe data packets can be faked, by having a newer operating system use the format of the outdated operating system. Similarly, responses to probe data packets can appear as if a vulnerable application is running in order to bait certain attacks. A follow up with the attack from the same device can be determinative of maliciousness.

Because the deceptive proxy device 110 has some physical or logical separation from the legitimate device 120, there should be no harm to the critical resources of a private network. Further, the deceptive proxy device 110 may signal that a vulnerability is present while hiding defenses against the same. In some cases, the deceptive proxy device 120 is initially reached through an IP address of the legitimate device 120, and once data traffic is checked, passed on to the legitimate device 120. The legitimate device 120 can be located on the same device and protected logically through a different partition or physically through a different hard drive. In another case, the deceptive proxy device 110 has a secondary IP address used to forward data packets to the legitimate device 120.

The legitimate device 120, in an embodiment, can be any network device, such as an access point, a router, a switch, a server, a database, a gateway or an end point. In an embodiment, the legitimate device 120 also has its own vulnerability protection against network traffic. The legitimate device 120 can be reached through an IP address or a common IP address shared with the deceptive proxy device 110. The legitimate device 120 can be located on an enterprise network behind a firewall or can be located on the cloud. FIG. 2 is a more detailed block diagram illustrating the proxy deception device 110 of the system of FIG. 1, according to one embodiment. The deceptive proxy device 110 includes a fake vulnerability module 210, a traffic monitoring module 220, a security module 230 and a network communication module 240. The components can be implemented in hardware, software, or a combination of both.

The decoy device 130 operates alongside the legitimate device, as a first line of defense against the malicious device 101. The decoy device 130, in some embodiments, mimics the legitimate device 120 with respect to responsive data packets and data flows, to appear indistinguishable to scanning processes of the malicious device 101. As a result, the malicious device 110 could interpret the decoy device 130 as legitimate. When an external device interacts with the decoy device 130 using its IP address, the interaction could be illegitimate and should be subject to scrutiny. Preferably, there are many more decoy devices 130 than legitimate devices to reduce the probability that random scans land on a legitimate device. For example, there can be two decoys for every legitimate device, or for better protection, there can be five or ten decoys for every legitimate device.

FIG. 2 is a more detailed block diagram illustrating the proxy deception device 110 of the system of FIG. 1, according to one embodiment. The deceptive proxy device 110 includes a fake vulnerability module 210, a traffic monitoring module 220, a security module 230 and a network communication module 240. The components can be implemented in hardware, software, or a combination of both.

The fake vulnerability module 210 can expose a plurality of fake vulnerabilities to network traffic in front of an active, legitimate resource. Each fake vulnerability cannot harm the legitimate resource due to the proxy relationship. In one case, a network administrator configures fake vulnerabilities and, in other cases, they are configured automatically over the cloud or by default.

The traffic monitoring module 220 can monitor network traffic in real-time, to detect an attack by a malicious device concerning at least one of the fake vulnerabilities of the plurality of fake vulnerabilities exposed by the deceptive proxy resource. For example, data packets from a specific IP address can be tracked over time to determine behavior as being malicious or not. The deceptive proxy device and the legitimate device are reachable by a common IP address, and acceptable interactions are forwarded from the deceptive proxy device to the legitimate device. Attacks on fake vulnerabilities are recognized and related data packets are not forwarded.

The security module 230, responsive to detecting a potential attack, takes a security action with respect to the malicious device, in some cases. Security actions are implementation-specific, but can include quarantine, blocking, flagging, notification to a network administrator, or the like as dictated by security policy.

The network communication module 240 includes software and hardware necessary for channel communications. For example, an Ethernet port can be provided for uplink communications and a Wi-Fi transceiver can be provided for downlink communications. Network protocols can be supported by software that communicates with the operating system to packetize outgoing data streams and depacketize and reconstruct incoming data streams.

FIG. 3 is a more detailed block diagram illustrating the decoy device 120 of the system of FIG. 1, according to one embodiment. The decoy device 110 includes a device profile module 210 for mimicking a legitimate device to malicious devices. Similar to the deceptive proxy device 110, the decoy device 130 can include a traffic monitoring module 320, a security module 330 and a network communication module 340. The components can be implemented in hardware, software, or a combination of both.

II. Methods for Deceptive Proxy Resources (FIGS. 4-5)

Figure 4:
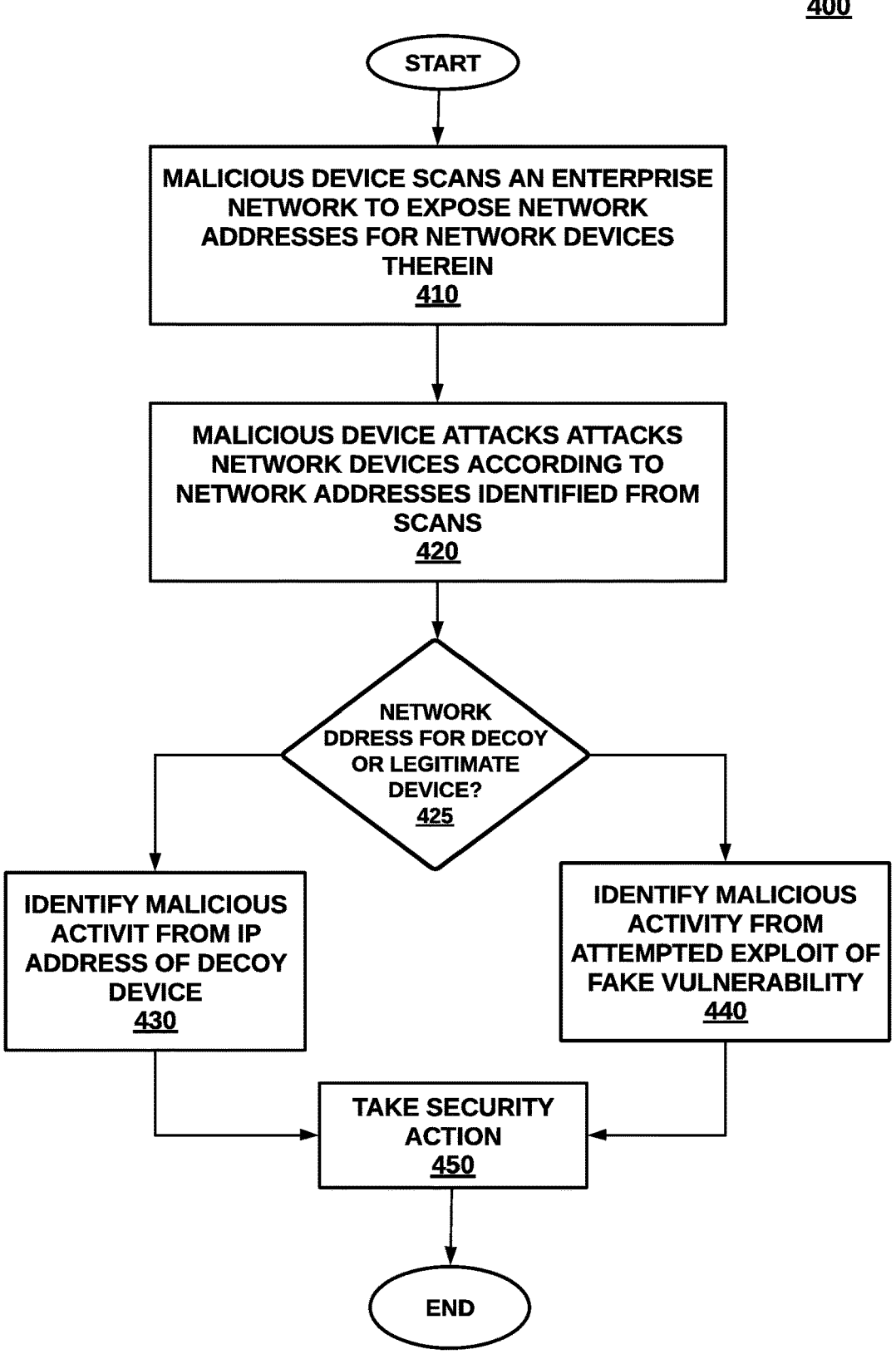
FIG. 4 is a high-level flow diagram illustrating a method for identifying attacks using fake vulnerabilities as a multi-layer deception defense, according to an embodiment.
Figure 5:
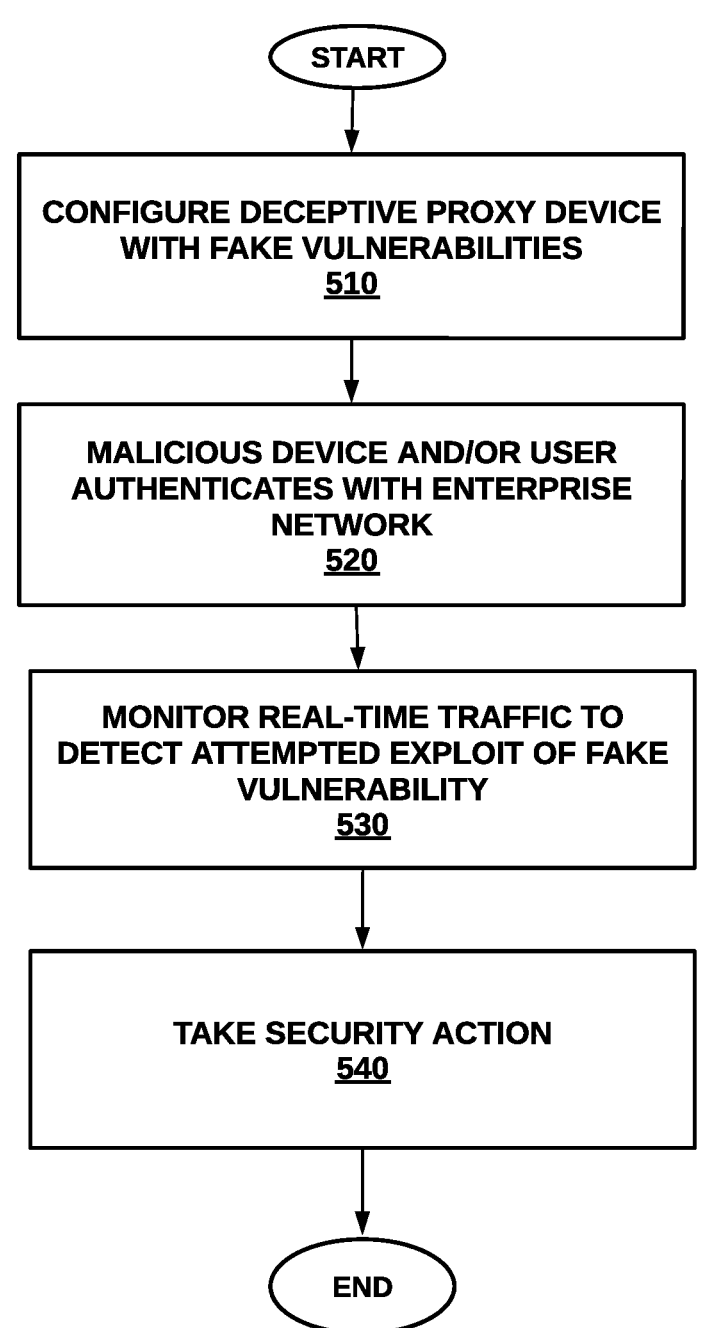
FIG. 5 is a flow diagram illustrating a method for identifying a malicious device based on exploitation of a fake vulnerability by a trusted device, according to an embodiment.

FIG. 4 is a high-level flow diagram of a method 400 for identifying attacks using fake vulnerabilities as a multi-layer deception defense, according to an embodiment. The method 400 can be implemented by, for example, system 100 of FIG. 1. The specific grouping of functionalities and order of steps are a mere example as many other variations of method 400 are possible, within the spirit of the present disclosure. Other variations are possible for different implementations.

At step 410, a malicious device scans an enterprise network to expose network addresses for network devices therein. Deeper scanning can also be used to identify supposed vulnerabilities of the network devices. The network addresses can correspond to both decoy devices and legitimate devices, that preferably appear indistinguishable to malicious devices. At step 420, the malicious device attacks fake vulnerabilities of the exposed network addresses. The vulnerabilities can be well-known.

At step 425, if a network address used for the attack reaches a decoy device, the malicious device can be identified due to the network address used for access corresponding to a decoy device, at step 430. On the other hand, at step 440, if the network address reaches a deception proxy device, acting on behalf of a legitimate device, the malicious device can be identified based on an attempted exploitation of a fake vulnerability.

FIG. 5 is a flow diagram detailing a method 500 for identifying a malicious device based on exploitation of a fake vulnerability by a trusted device, according to an embodiment.

At step 510, a deceptive proxy resource of the enterprise network is configured to expose a plurality of fake vulnerabilities to network traffic alongside an active resource. Each fake vulnerability cannot harm the active resource. The deceptive proxy device and the legitimate device are reachable by a common IP address.

At step 520, the malicious device and/or user authenticates with the enterprise network. Authentication includes, but is not limited to, login with user name and password, multi-factor authentication, public-private key, device recognition, CAPTCHA, biometric, and the like. Once authenticated, information such as legitimate IP addresses can be exposed as it is assumed that the device is not malicious from the point of view of the enterprise network.

At step 530, network traffic is monitored in real-time to detect an attack by a malicious device concerning at least one of the fake vulnerabilities of the plurality of fake vulnerabilities exposed by the deceptive proxy resource.

At step 540, responsive to the attack detection, a security action is taken with respect to the malicious device and/or user.

III. Computing Device for Deceptive Proxy Resources (FIG. 6)

FIG. 6 is a block diagram illustrating a computing device 600 for use in the system 100 of FIG. 1, according to one embodiment. The computing device 600 is a non-limiting example device for implementing each of the components of the system 100, including proxy deceptive device 110 and legitimate device 120, and parallel deceptive device 130. Additionally, the computing device 600 is merely an example implementation itself, since the system 100 can also be fully or partially implemented with laptop computers, tablet computers, smart cell phones, Internet access applications, and the like.

The computing device 600, of the present embodiment, includes a memory 610, a processor 620, a hard drive 630, and an I/O port 640. Each of the components is coupled for electronic communication via a bus 650. Communication can be digital and/or analog, and use any suitable protocol.

The memory 610 further comprises network access applications 612 and an operating system 614. Network access applications can include 612 a web browser, a mobile access application, an access application that uses networking, a remote access application executing locally, a network protocol access application, a network management access application, a network routing access applications, or the like.

The operating system 614 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 620 can be a network processor (e.g., optimized for IEEE 802.11), a general purpose processor, an access application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the hard drive 630.

The storage device 630 can be any non-volatile type of storage such as a magnetic disc, EEPROM, Flash, or the like. The storage device 630 stores code and data for access applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output. In one embodiment, the network interface 644 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, Javascript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples).

For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase network appliance generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTI-GATE family of network security appliances and FORTI-CARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI Wi-Fi family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use. The scope of the invention is defined by the following claims.

I claim:

1. A computer-implemented method in a deceptive proxy device using fake vulnerabilities for identifying attacks to a legitimate device of an enterprise network by trusted devices, the method comprising:

configuring a deceptive proxy resource of the enterprise network to expose a plurality of fake vulnerabilities to network traffic alongside an active resource, wherein each fake vulnerability cannot harm the active resource and wherein the deceptive proxy device and the legitimate device are reachable by a common Internet Protocol (IP) address;

monitoring network traffic in real-time to detect an attack by a malicious device concerning at least one of the fake vulnerabilities of the plurality of fake vulnerabilities exposed by the deceptive proxy resource, wherein the malicious device is trusted by the enterprise network; and responsive to the attack detection, taking a security action with respect to the malicious device.

2. The method of claim 1, wherein resource is located external to the enterprise network.

3. The method of claim 1, further comprising deception resources alongside the actual resources of the enterprise network, wherein deception resources have IP addresses distinct from IP addresses of the actual resources.

4. The method of claim 1, wherein the malicious device scans the resource to identify a fake vulnerability for attack.

5. The method of claim 1, wherein the trusted device is located within the enterprise network.

6. The method of claim 1, wherein the trusted device is located external to the enterprise network.

7. The method of claim 1, wherein the malicious device that has been authenticated to the enterprise network.

8. The method of claim 1, wherein a user of the malicious device has been authenticated to the enterprise network.

9. The method of claim 1, wherein an actual IP address of the actual resource has been exposed to the malicious device based on authentication.

10. The method of claim 1, wherein a deception device, having an IP address that is unrelated to the active resource, is exposed to network traffic alongside the deceptive proxy resource and the active resource.

11. A non-transitory computer-readable medium in a deceptive proxy device on a data communication network, using fake vulnerabilities for identifying attacks to a legitimate device of an enterprise network by trusted device, the method comprising:

configuring a deceptive proxy resource of the enterprise network to expose a plurality of fake vulnerabilities to network traffic alongside an active resource, wherein each fake vulnerability cannot harm the active resource and wherein the deceptive proxy device and the legitimate device are reachable by a common Internet Protocol (IP) address;

monitoring network traffic in real-time to detect an attack by a malicious device concerning at least one of the fake vulnerabilities of the plurality of fake vulnerabilities exposed by the deceptive proxy resource, wherein the malicious device is trusted by the enterprise network; and responsive to the attack detection, taking a security action with respect to the malicious device.

12. A deceptive proxy device, for using fake vulnerabilities for identifying attacks to a legitimate device of an enterprise network by trusted devices, the deceptive proxy device comprising:

a processor;

a network interface communicatively coupled to the processor and to a data communication network; and a memory, communicatively coupled to the processor and
storing:
  a fake vulnerability module to expose a plurality of
  fake vulnerabilities to network traffic alongside an
  active resource, wherein each fake vulnerability can-
  not harm the active resource and wherein the decep-
  tive proxy device and the legitimate device are
  reachable by a common Internet Protocol (IP)
  address;
  a traffic monitoring module to monitor network traffic
  in real-time, to detect an attack by a malicious device
  concerning at least one of the fake vulnerabilities of
  the plurality of fake vulnerabilities exposed by the
  deceptive proxy resource, wherein the malicious
  device is trusted by the enterprise network; and
  a security module to, responsive to the attack detection,
  take a security action with respect to the malicious
  device.

13. The method of claim 11, wherein resource is located
external to the enterprise network.

14. The method of claim 11, further comprising deception
resources alongside the actual resources of the enterprise
network, wherein deception resources have IP addresses
distinct from IP addresses of the actual resources.

15. The method of claim 11, wherein the malicious device
scans the resource to identify a fake vulnerability for attack.

16. The method of claim 11, wherein the trusted device is
located within the enterprise network.

17. The method of claim 11, wherein the trusted device is
located external to the enterprise network.

18. The method of claim 11, wherein the malicious device
that has been authenticated to the enterprise network.

19. The method of claim 11, wherein a user of the
malicious device has been authenticated to the enterprise
network.

20. The method of claim 11, wherein an actual IP address
of the actual resource has been exposed to the malicious
device based on authentication.

* * * * *